United States Patent [19]

Dorski

[11] Patent Number: 4,925,366
[45] Date of Patent: May 15, 1990

[54] COMBINED COOLANT PUMP IMPELLER AND SEAL ASSEMBLY

[75] Inventor: Ronald L. Dorski, Marblehead, Ohio

[73] Assignee: General Motors Corporation, Detroit, Mich.

[21] Appl. No.: 375,152

[22] Filed: Jul. 3, 1989

[51] Int. Cl.⁵ ............................................. F04D 29/12
[52] U.S. Cl. ............................... 415/174.3; 416/241 A
[58] Field of Search ............... 415/174.2, 174.3, 174.4; 416/174 R, 241 A

[56] References Cited

U.S. PATENT DOCUMENTS

| | | | |
|---|---|---|---|
| 2,671,407 | 3/1954 | Higbie | 415/174.3 |
| 2,671,408 | 3/1954 | Kreitchman | 416/241 A X |
| 3,228,342 | 1/1966 | Page | 415/174.2 X |
| 3,407,882 | 10/1968 | Wooden et al. | 416/241 A |
| 3,594,102 | 7/1971 | Oden | 415/174.3 X |
| 3,664,760 | 5/1972 | Reiner | 415/174.2 |
| 3,846,045 | 11/1974 | Mincuzzi | 416/230 |
| 4,502,697 | 3/1985 | Heinl | 277/41 |
| 4,548,547 | 10/1985 | Deuring | 415/174.3 |

FOREIGN PATENT DOCUMENTS 359036  1/1962  Switzerland ................... 416/241 X Primary Examiner—Everette A. Powell, Jr.
Attorney, Agent, or Firm—Patrick M. Griffin

[57] ABSTRACT

The need for a separate seal spring and sealing boot in an automotive water pump seal is eliminated by molding a flexible seal face mount integrally with the impeller.

2 Claims, 1 Drawing Sheet

COMBINED COOLANT PUMP IMPELLER AND SEAL ASSEMBLY

This invention relates to automotive coolant pumps in general, and specifically to a combined impeller and seal assembly for such a pump.

BACKGROUND OF THE INVENTION

Automotive water pumps typically include a liquid filled pump housing, through which a rotatable pump shaft coaxially extends. An impeller is mounted to the shaft within the housing, and a bearing supports the shaft at a position axially spaced from the impeller. A rotating seal interface must be maintained axially between the impeller and the bearing to prevent the loss of coolant from the housing and protect the bearing. Typically, a rotating seal face is fixed to the shaft, or perhaps against the back of the impeller, and it is resiliently maintained in pressurized sealing contact with a stationary seal face fixed somehow to the housing, surrounding the shaft. The resilience is generally provided by a coil spring or wavy washer, and some sort of sealing boot or bellows must be provided to cover the spring to prevent coolant from flowing through the spring.

SUMMARY OF THE INVENTION

The invention eliminates the spring and its sealing boot as separate components by providing a combined impeller and seal assembly as a single component. The pump impeller is molded of a partially resilient plastic, with a central hub sized to make a tight interference fit with the pump shaft. Integrally molded to the impeller is a flexible seal mount in the form of a conical wall that extends axially and radially from the impeller, near the hub, in surrounding relation to the shaft. The conical wall, which is circumferential continuous, terminates in a seal face that is axially opposed to the stationary seal face. Thus, when the impeller hub is fitted to the shaft and pushed axially toward the stationary seal face, contact is made and the flexible conical wall is deflected from its free state. This maintains a resilient pressure between the seal faces, preventing coolant loss on one axial side of the the rotatable seal face, eliminating the need for a spring. Since the conical wall is continuous, it provides a seal on the other axial side of the rotatable seal face, eliminating the need for a sealing boot.

It is, therefore, a general object of the invention to provide an automotive coolant pump seal that eliminates the conventional spring and sealing boot as separate components.

It is another object of the invention to provide a combined pump impeller and seal assembly in which the pump impeller, which is integrally molded of a partially resilient plastic material, has a flexible support for a rotatable seal face integrally molded to it, so as to be able to resiliently maintain sealing pressure between the rotatable seal face and a stationary seal face with no need for a separate spring.

It is another object of the invention to provide such a seal support integrally molded with the impeller that is circumferentially continuous, so as to eliminate the need for a separate sealing boot or bellow.

DESCRIPTION OF THE PREFERRED EMBODIMENT

These and other objects and features of the invention will appear from the following written description, and from the drawings, in which.

Figure 3:
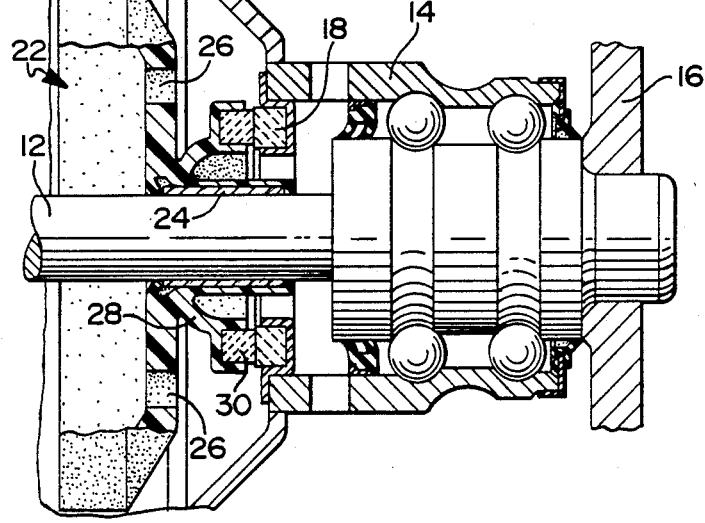
FIG. 3 is a sectional view of the preferred embodiment of the invention installed.

Referring first to FIG. 3, the invention is used in an automotive coolant pump that has a stationary, engine mounted pump housing 10 through which extends a coaxial pump shaft 12. Pump shaft 12 is supported by a bearing 14, which is welded to housing 10, and powered by a driven pulley 16. Bearing 14, in effect, becomes one with housing 10, but is not filled with liquid coolant. A stationary seal face 18, which is an annular, ceramic ring, is mounted at the juncture of housing 10 and bearing 14, concentric to and surrounding shaft 12. A preferred embodiment of the combined impeller shaft and seal assembly of the invention, indicated generally at 20, is located on one axial side of stationary seal face 18, the left side as seen in FIG. 3. Liquid coolant must be prevented from escaping and to prevent damage to bearing 14.

Figure 1:
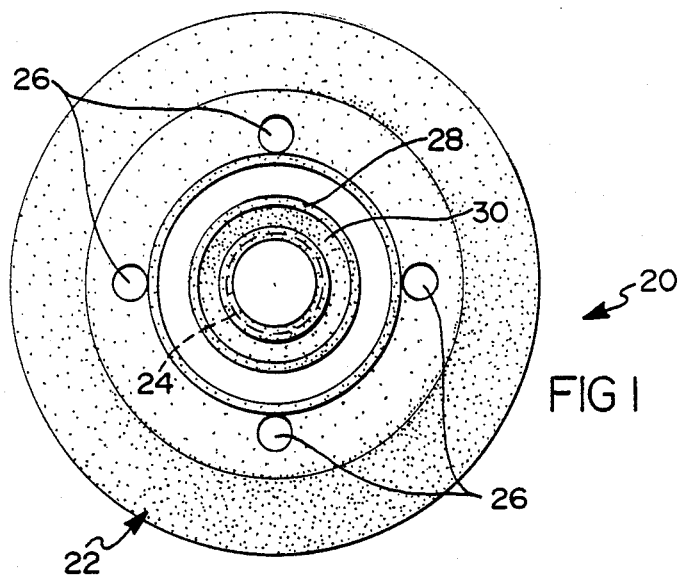
FIG. 1 is a front end view of a preferred embodiment of the invention.
Figure 2:
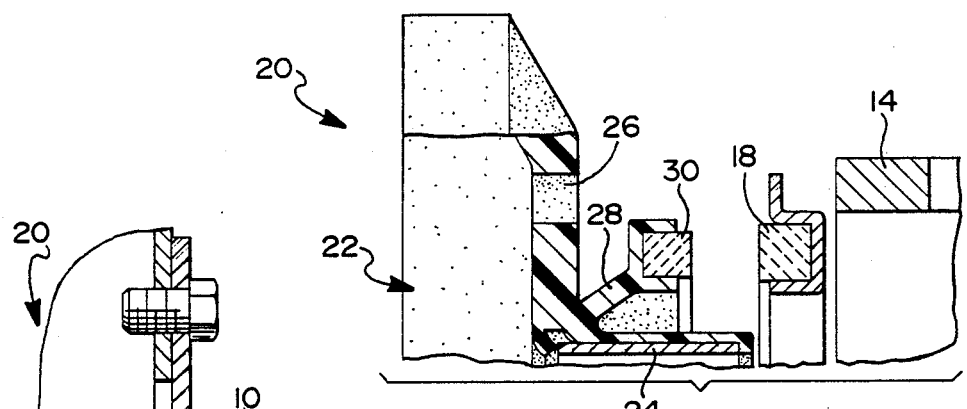
FIG. 2 is a sectional view of part of the preferred embodiment of the invention before installation, plus part of the housing and stationary seal face.

Referring next to FIGS. 1 and 2, the combined impeller and seal assembly of the invention 20 includes an impeller, designated generally at 22, which is molded of a partially resilient plastic material, such as a polyurethane elastomer. Impeller 22 has a cylindrical hub 24 sized, and reinforced if needed, so as to make a tight push fit with the shaft 12. Several tool access holes 26 are molded through the body of impeller 22 for installation purposes. Integrally molded with impeller 22, near the juncture with hub 24, is a generally conical wall 28 that extends radially outwardly and axially inwardly at about a 45 degree angle. Wall 28 terminates in an annular groove that contains a rotatable seal face 30, which is an annular ceramic ring, like seal face 18. Seal face 30 may be glued, mold in, or otherwise mounted to wall 28. As seen in FIG. 2, which shows the free, preinstallation state of conical wall 28, seal face 30 is concentric to, and axially opposed to, stationary seal face 18.

Referring next to FIGS. 2 and 3, to install impeller 22, its hub 24 is fixed to shaft 12 with an axial push fit. The contact between impeller hub 24 and shaft 12 is close enough to be liquid tight. When impeller 22 is pushed axially toward stationary seal face 18 sufficiently, the two seal faces 18 and 30 eventually make contact. A suitable tool inserted through impeller access holes 26, not illustrated, would serve both to push stationary seal face 18 in place, and also to determine the final axial installation position of impeller 22 relative to the blind stationary seal face 18. Impeller 22 would be pushed in axially far enough that conical wall 28 would be compressed and bulged axially in and radially out from its FIG. 2 free state position, as seen in FIG. 3. Because of the resilience of the material from which impeller 22 and conical wall 28 are molded, conical wall 28 is sufficiently flexible to maintain a pressurized sealing contact at the interface between the seal faces 18 and 30. This is the function normally provided by a separate metal spring. Liquid coolant cannot escape housing 10 on the right axial side of the rotatable seal face 30. In addition because the conical wall 28 is circumferentially continuous, liquid cannot escape housing 10 on the left axial side of rotatable seal face 30, either. Therefore, conical wall 28 also serves the function normally provided by a separate seal boot or bellows surrounding the spring. The multiple functions provided by the integrally molded seal mounting wall 28 make for a very simple and inexpensive unit.

Variations of the preferred embodiment may be made. The flexible seal mount integrally molded to the impeller need not be circumferentially continuous. It could be a series of separate fingers if desired, which might make for a more easily molded shape for the impeller. Then, of course, a separate sealing boot would have to be added. Therefore, it will be understood that it is not intended to limit the invention to just the embodiment disclosed.

The embodiments of the invention in which an exclusive property or privilege is claimed are defined as follows:

1. A combined impeller and seal assembly for use in an automotive coolant pump of the type having a liquid filled pump housing and a rotatable pump shaft extending coaxially through said housing, said housing further including a stationary seal face concentric to said shaft, comprising,
   a pump impeller adapted to be fixed to said shaft, said impeller being molded of a partially resilient plastic material and further including a flexible seal mount molded integrally with said impeller and generally coaxial to said stationary seal face in its free state, and,
   a rotatable seal face fixed to said flexible seal mount axially opposed to said stationary seal face, so as to be engageable therewith,
   whereby, when said impeller is fixed to said shaft, it can be moved axially toward said stationary seal face until contact is made with said rotatable seal face and said flexible seal mount is axially deflected and compressed from its free state, thereby resiliently maintaining a pressurized sealing contact at the interface between said stationary and rotatable seal faces sufficient by itself to seal said liquid within said pump housing.

2. A combined impeller and seal assembly for use in an automotive coolant pump of the type having a liquid filled pump housing and a rotatable pump shaft extending coaxially through said housing, said housing further including a stationary seal face concentric to said shaft, comprising,
   a pump impeller adapted to be fixed to said shaft, said impeller being molded of a partially resilient plastic material and further including a generally conical wall molded integrally thereto extending axially and readily therefrom and surrounding said shaft, said wall being circumferentially continuous and terminating in a rotatable seal face axially opposed to said stationary seal face, so as to be engageable therewith,
   whereby, when said impeller is fixed to said shaft, it can be moved axially toward said stationary seal face until contact is made with said rotatable seal face and said conical wall is axially deflected and compressed from its free state, thereby resiliently maintaining a pressurized sealing contact between said stationary and rotatable seal faces on one axial side of said rotatable seal face sufficient by itself to seal said liquid within said pump housing, with said conical wall providing a seal on the other axial side of said rotatable seal face.

* * * * *